Figure 1:
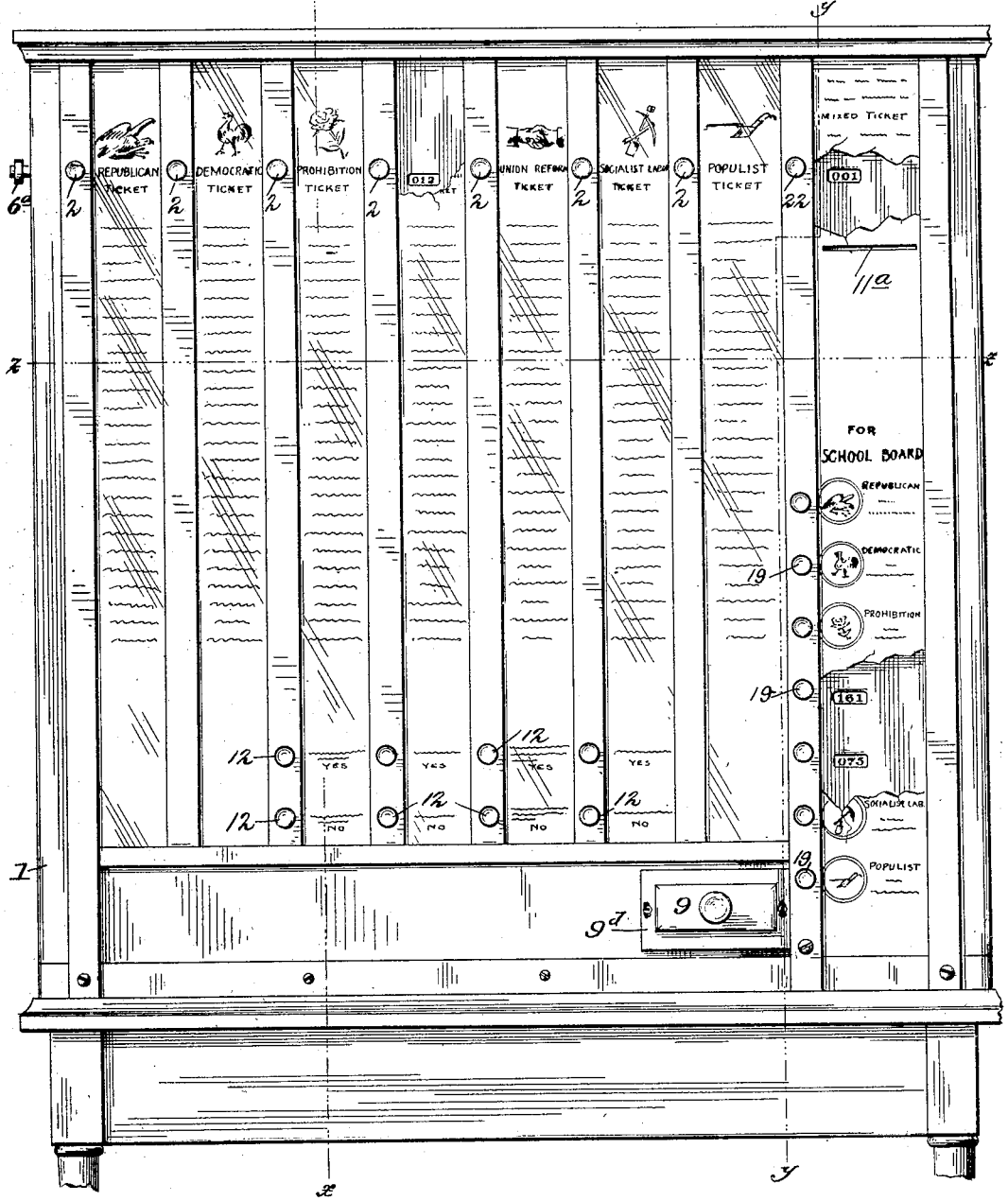

No. 701,324. Patented June 3, 1902.
O. A. GATRELL.
VOTING MACHINE.
(Application filed July 31, 1901.)
(No Model.) 5 Sheets—Sheet 1.

Witnesses
Thos. E. French
Silas Martin

Inventor
Ottmar A. Gatrell
by Findell & Findell
his Attorneys

No. 701,324. Patented June 3, 1902.
O. A. GATRELL.
VOTING MACHINE.
(Application filed July 31, 1901.)
(No Model.) 5 Sheets—Sheet 2.

Witnesses   Inventor
Thos. E. French   Ottmar A. Gatrell
Silas Martin   by Finckel & Finckel
   his Attorneys No. 701,324. Patented June 3, 1902.
O. A. GATRELL.
VOTING MACHINE.
(Application filed July 31, 1901.)
(No Model.) 5 Sheets—Sheet 3.

Witnesses
Thos. E. French
Silas Martin

Inventor
Ottmar A. Gatrell
by Finckel & Finckel
his Attorneys

No. 701,324. Patented June 3, 1902.
O. A. GATRELL.
VOTING MACHINE.
(Application filed July 31, 1901.)
(No Model.) 5 Sheets—Sheet 4.

Witnesses
Thos. E. French
Silas Martin

Inventor
Ottmar A. Gatrell
by Finckel & Finckel
his Attorneys

No. 701,324. Patented June 3, 1902.
O. A. GATRELL.
VOTING MACHINE.
(Application filed July 31, 1901.)
(No Model.) 5 Sheets—Sheet 5.
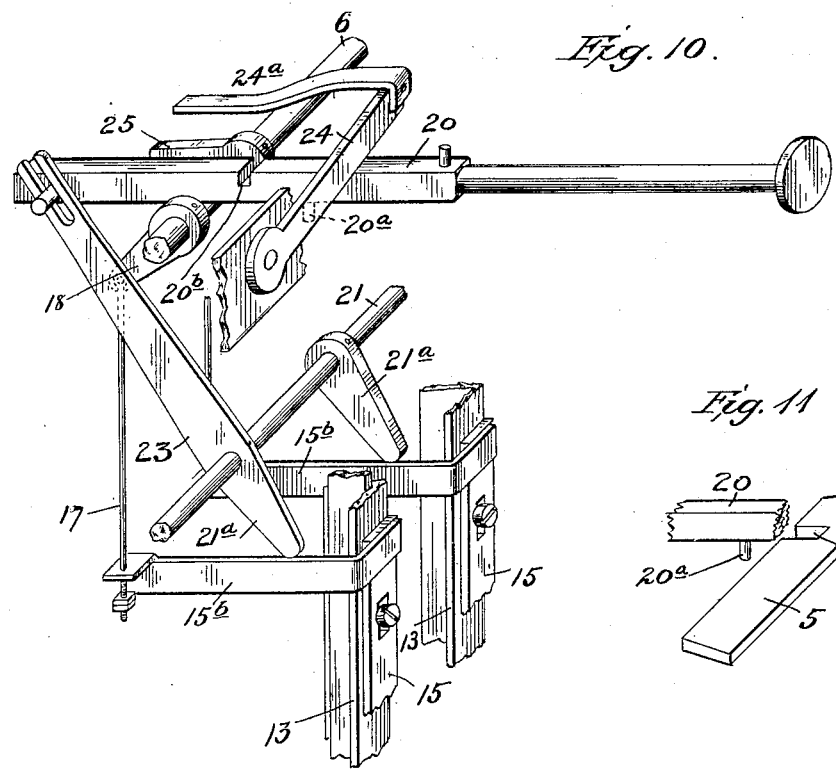
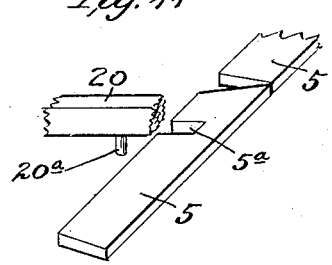
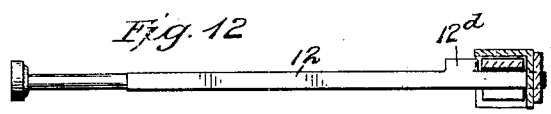
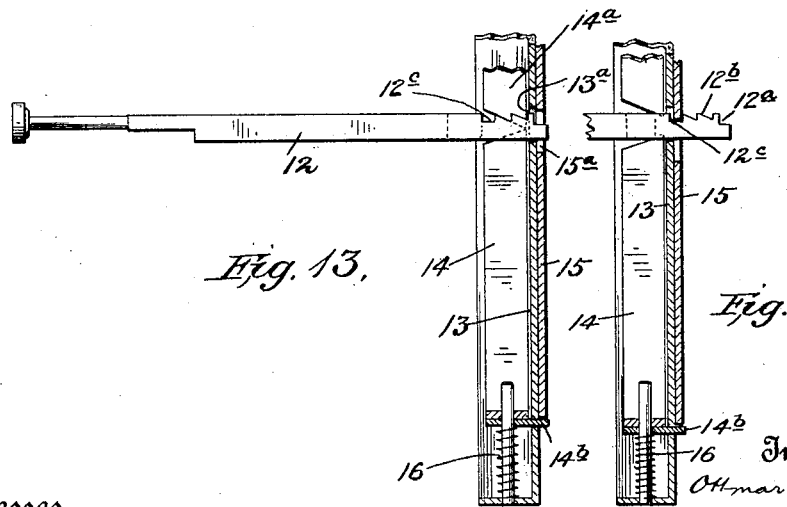
Witnesses
Thos. E. French
Silas Martin
Inventor
Ottmar A. Gatrell
by Finckel & Finckel
his Attorneys

UNITED STATES PATENT OFFICE.

OTTMAR A. GATRELL, OF COLUMBUS, OHIO, ASSIGNOR TO PRESTON C. HOUSTON, OF JAMESTOWN, NEW YORK.

VOTING-MACHINE.

SPECIFICATION forming part of Letters Patent No. 701,324, dated June 3, 1902.

Application filed July 31, 1901. Serial No. 70,407. (No model.)

*To all whom it may concern:*

Be it known that I, OTTMAR A. GATRELL, a citizen of the United States, residing at Columbus, in the county of Franklin and State of Ohio, have invented certain new and useful Improvements in Voting-Machines; and I do hereby declare the following to be a full, clear, and exact description of the invention, such as will enable others skilled in the art to which it appertains to make and use the same.

Voting-machines as heretofore designed have usually been of such complicated construction that the cost of them and the difficulty of learning to manipulate them will likely be so great as to preclude their universal adoption. I am at this time impressed that a machine which will permit both mechanical voting and ballot-voting, the latter practically as heretofore, is the simplest way to avoid complexity and cost and to effect the main purpose of voting-machines—to wit, a speedy count and quick returns. As a large majority of the tickets are voted "straight," a machine which provides for rapid "straight voting" and counting will go as far as need be, I think, toward this end. My present machine therefore aims, chiefly, to provide means whereby a straight party-ticket by the operation of a key or lever or a "scratched" or mixed ballot, printed or written, be cast, means being provided to prevent the use of the other mode if one of these is adopted by the voter.

In some commonwealths or municipalities a class of electors is excluded from voting for nominees for some offices—as, for example, in the State of Ohio women are privileged to vote only for nominees on the school-board. Therefore in my present machine I provide improved means operative by the election-officer to lock out all voting devices except those permissible to be used by the particular elector entering the booth.

My invention also contemplates the provision, in combination with the stated parts, of means permitting the elector to vote "Yes" or "No" upon propositions submitted to them.

A number of devices can be added to my machine as herein shown for accomplishing purposes ancillary to the main objects—as, for example, an indicator to indicate when an elector has voted, a register to count the total vote, a timing device to ascertain the time an elector shall occupy the booth, locks to secure closed the entire machine until opened by the proper officers, &c.; but these are devices supplementary to the principal mechanism herein, and are not, therefore, particularly described.

Figures 2, 3:
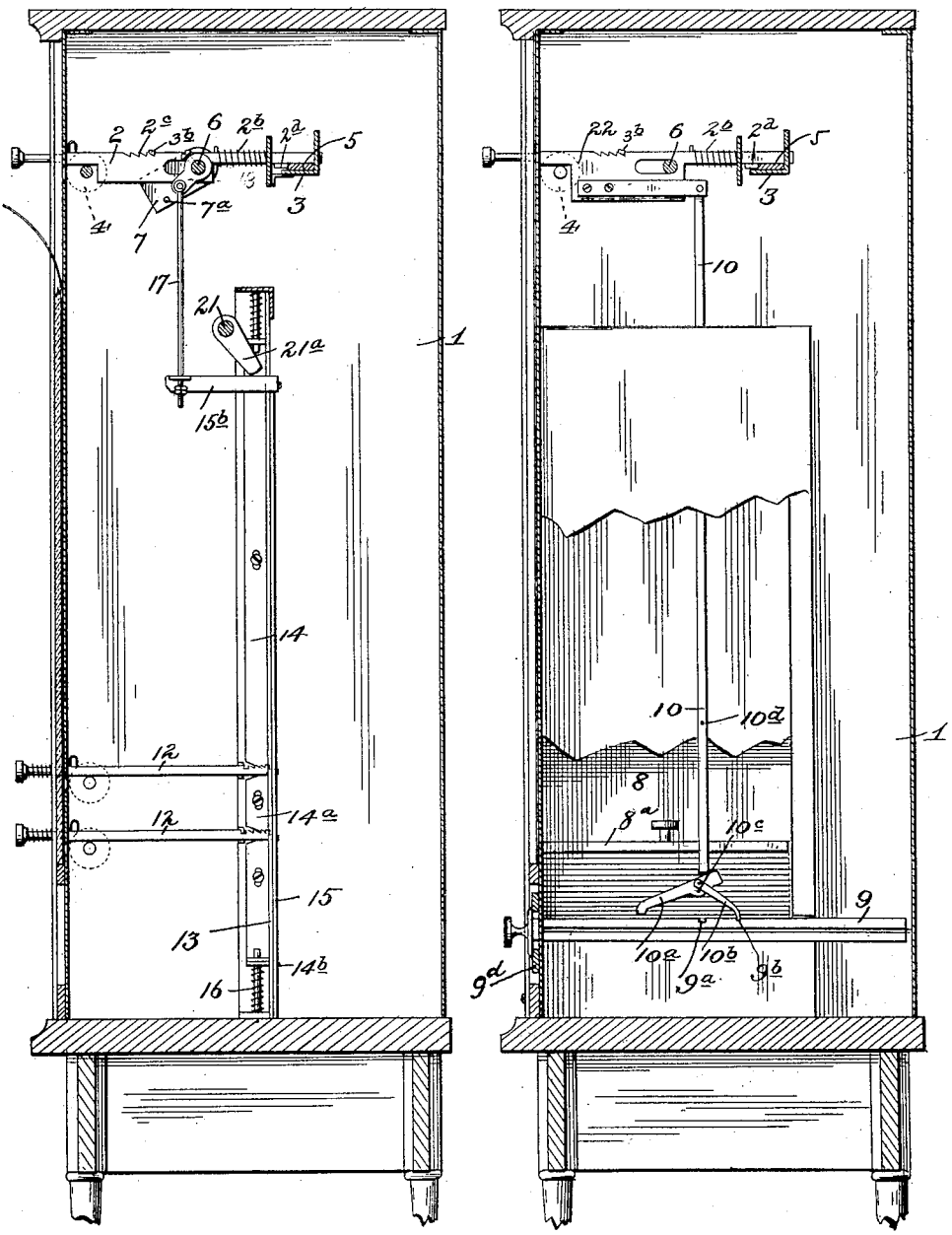
Figure 4:
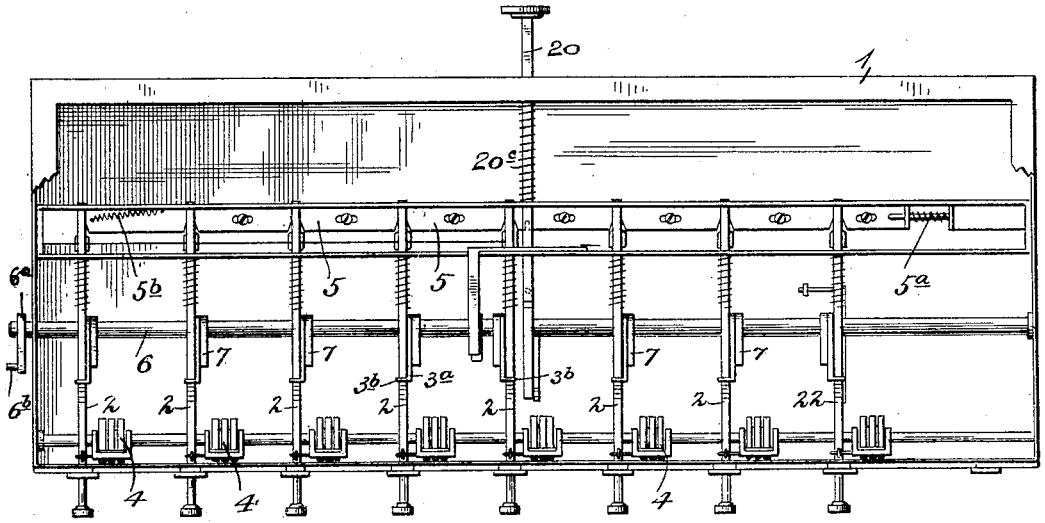
Figure 5:
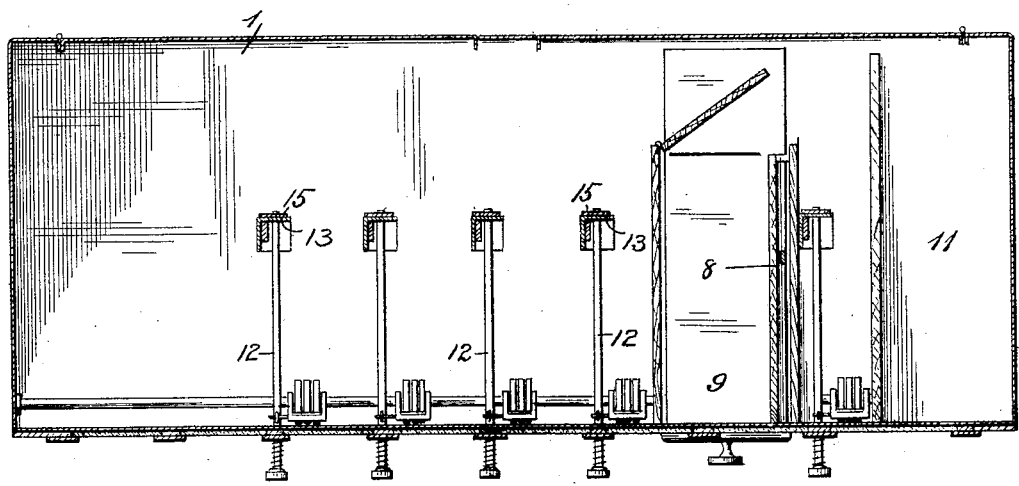
Figure 6:
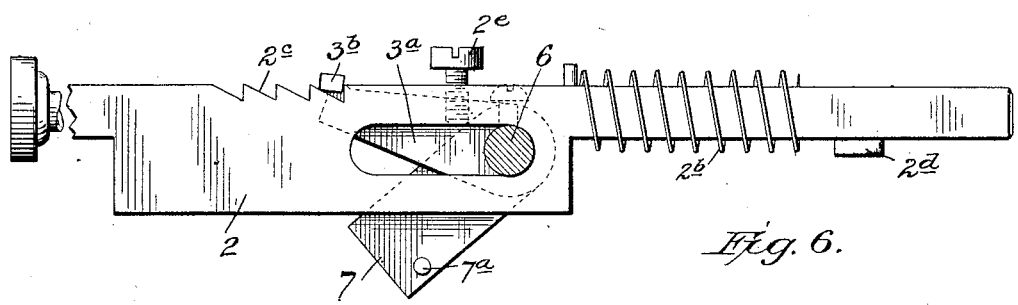
Figure 7:
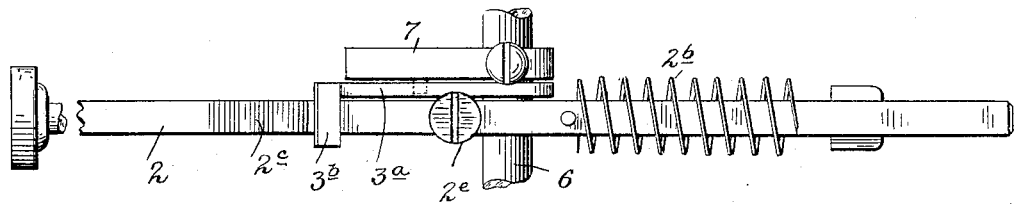
Figure 8:
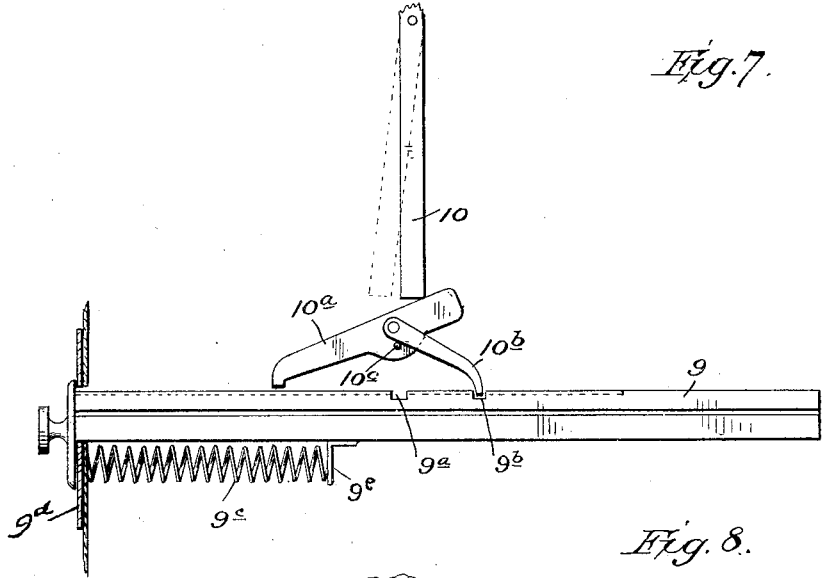
Figure 9:
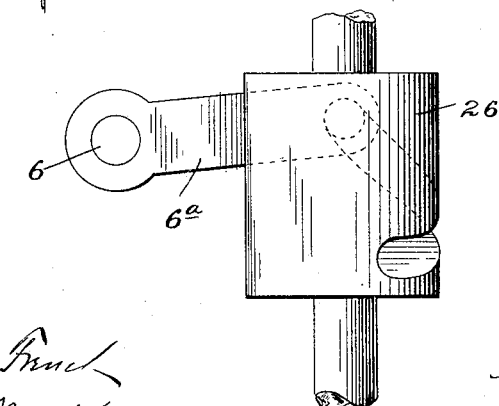

In the accompanying drawings, illustrating one embodiment of my invention, Figure 1 is a front view of the machine, small portions of the right-hand ticket-strip being broken out. Fig. 2 is a vertical sectional view on the plane $x$ $x$, Fig. 1. Fig. 3 is a sectional view taken on vertical planes indicated by the line $y$ $y$, Fig. 1. Fig. 4 is a top plan view of the upper key mechanism and the resetting devices. Fig. 5 is a horizontal section showing the lower key mechanism and ballot-receptacles, said view being taken on a plane indicated by the line $z$ $z$, Fig. 1. Fig. 6 is a detail in side view, on an enlarged scale, of a key from the upper key system of Fig. 1. Fig. 7 is a top view of what is shown in Fig. 6. Fig. 8 is a side or edge view of the ballot-drawer and locking and releasing devices therefor. Fig. 9 is a view of a cylinder-cam for resetting the voting mechanism. Fig. 10 is an oblique view of the devices for locking out a portion of the voting devices. Fig. 11 is an oblique in further disclosure of the devices referred to in Fig. 10. Fig. 12 is a plan view, on an enlarged scale, of one of the keys of the lower system, said key being in its inner or voted position. Fig. 13 is a side view of the same. Fig. 14 is a similar view showing the end of the same key voted and locked.

Some of the parts herein shown are substantially the same as shown and described in my Letters Patent of the United States dated October 2, 1900, No. 658,771, and it will be unnecessary to describe with great particularity herein such features as are common to the two machines.

In the views of the accompanying drawings, 1 designates the frame or case of the machine. Arranged in a horizontal row in the upper part of the case is a series of push-key bars 2 and 22, having their outer ends, which protrude through holes in the front wall of the case, provided with buttons and their inner portions provided with springs $2^b$, tending to hold said keys normally withdrawn. Each of these keys except that designated 22 at the extreme right is intended for voting a straight regularly-nominated party-ticket, the ticket being indicated on a strip of paper secured in the face of the case directly to the right of the key. The inner ends of the key-bars are supported upon and pass through the rear wall of an angle or channel bar 3, supported horizontally between the end walls of the case. The keybars 2 are formed at their upper edges with notches $2^c$, to be engaged by a dog or latch $3^a$ to hold the key when pushed in or voted, and at their under sides with a wedge projection $2^d$ for the purpose hereinafter explained.

In order to prevent the pushing in or voting of more than one key in the straight-ticket row, there is arranged in the channel of the bar 3 a series of horizontally-movable blocks 5, having their adjoining ends beveled, as indicated in Fig. 4. These blocks are yieldingly held together by springs $5^a$ and $5^b$, and the blocks are so placed that the spaces between them lie opposite the wedge projection $2^d$ on the several key-bars, and when a key-bar is pushed in or voted the blocks are separated and allow the movement of the key; but the blocks are of such length and number that one key only can be pushed into a space between them, substantially as in my former patent referred to.

Arranged near the front wall of the case and adjacent each key-bar is a register or counter 4 of any suitable construction, adapted to be operated each time a key is voted. This register or counter can be arranged to have its numbers visible through a slot in the front of the casing when the strip bearing the name of the nominees is removed, as seen at the right-hand side of Fig. 1.

Journaled between the ends of the case is a shaft 6, upon which the dogs or latches $3^a$, having a tongue $3^b$ to engage notches $2^c$, are loosely hung, and keyed to this shaft are also fingers 7, having a lateral projection $7^a$, reaching under the lower edge of the finger, so that when the finger is lifted by a partial rotation of the shaft 6 the latch will be lifted to release the key-bar. These latches hold the key when pushed in or voted until they are operated to release the keys. Each of the keys in the upper horizontal row is furnished with a latch and releaser. Stops $2^e$ in the upper edges of the keys can be provided to prevent the latches from being thrown upward too far if the shaft is operated violently. These stops are shown to be screws the heads of which project laterally beyond the sides of the key sufficiently to limit the upward movement of the latch $3^a$ and prevent it from being thrown completely over.

Arranged in the right-hand side of the case is a chamber or receptacle 8, into which a sufficient number of ordinary Australian paper ballots are placed prior to the holding of an election, and in the present instance these ballots are to be neatly folded and arranged in a pile or package in the receptacle. A weight can be placed on top of the pile, as indicated in Fig. 3, to prevent disarrangement of the ballots above as the bottom one is removed. At the bottom of the paper-ballot receptacle is a sliding drawer 9, having its upper side slightly recessed or provided near its inner end with a shoulder, as indicated by broken lines, Fig. 8, so that one folded ballot will just fill the recess. In front of the casing is an opening, over which is secured a vertically-adjustable plate $9^d$, also having an opening, said plate being made adjustable for the purpose of increasing or diminishing the width of the opening or slot through which the ballot is to be drawn. The right-hand edge of the drawer is shown to protrude through and beyond a slot in the right-hand wall of the ballot-receptacle and is there made with two notches $9^a$ and $9^b$. Pivoted to or near this wall 8 above the notches $9^a$ and $9^b$ is a lever-dog $10^a$, having hinged thereto another dog $10^b$, supported in angular relation thereto by a pin $10^c$ on the first-named dog. Fulcrumed at $10^d$ above the lever-dog $10^a$ is a long lever 10, attached at its upper end to the right-hand key 22 of the upper horizontal row of keys and having its lower end located to impinge upon and press down the upper end of the lever-dog $10^a$, so that the lower end of the dog $10^b$ shall be released to drop into position to engage the notch $9^b$ and lock the drawer in the closed position. Therefore in order to release the drawer it will be necessary to push inward the upper arm of the lever 10, whereupon the dog $10^a$ falls by gravity into position to drop into the notch $9^a$ when the drawer is drawn out and lock the same in its outer position. This drawer is shown to be provided with a spring $9^c$, located at its under side to be compressed by a projection $9^e$ when the drawer is drawn out, so that when the drawer is released from the dog $10^a$ the spring will restore the drawer to its inner position. Thus it will be observed that when the ballot-releasing key 22 is pushed in and the drawer pulled entirely out a voter is precluded from further manipulating the ballot-releasing key or the ballot-drawer, and only one ballot can be removed until the machine is reset by the proper election officer. When a voter elects to use a paper ballot, he deposits that ballot after having marked the same in accord with his choice through a slot $11^a$ into a compartment or receptacle 11 at the extreme right of the machine.

With the apparatus so far described it will be observed that the voter is compelled to make choice of one of two methods of voting, to wit: first, by pushing in one of the straight-ticket keys 2 and voting a straight ticket, or, second, with a ballot which may be marked to vote either straight or mixed, said ballot to be obtained by pushing in the ballot-releasing key 22. If he votes the straight ticket by key alone, he is precluded from voting with a ballot, or if he elects to vote by ballot he is precluded from voting a straight ticket by key, because the lock-out devices hereinbefore described are common to all the keys in the upper horizontal row, it being possible to operate one only of such keys.

In the lower portion of the case are the keys for voting upon propositions submitted for the approval or disapproval of the voter. These keys are arranged in as many pairs as there may be propositions to submit, one of each pair being for "Yes" and one for "No." The key-bar itself of these keys is designated 12 and is made at its inner end with a notch $12^a$, a series of serrations $12^b$, and a notch $12^c$ and on its side with a wedge $12^d$. The end of the key-bar 12 rests in a hole $13^a$ in one wall of an angle 13, arranged vertically in the machine. Within the angle-bar 13 are movable blocks 14 and $14^a$, similar to those heretofore designated 5, adapted to be separated by the wedge $12^d$ when a key-bar is pushed inward. Slidably arranged on the rear side of the angle-bar 13 is a bar 15, provided with holes $15^a$, said bar 15 resting on a projection $14^b$, secured to or formed with the block 14 and held up by a spring 16 normally in such a position that the holes in the bar 15 will allow the key-bar 12 to be pushed through; but when said key is pushed in or voted and the locking-blocks separated the block 14 is pushed down, and therefore the projection $14^b$ depressed, this bar will drop by gravity into the notch $12^c$ and into the notch $12^a$ or opposite the end of the companion key not voted, thus locking the voted key in and the unvoted key out. The pair of keys cannot be voted at the same time because of the intermediate movable block $14^a$. Extending horizontally from the upper extremity of the bar 15 is an arm $15^b$, to which is attached a drag-link 17, that in turn is attached to a crank-arm 18, fast on the shaft 6. The key-bars 12 are all reset when this shaft 6 is turned to reset the straight-ticket and ballot-releasing keys in the upper part of the machine, because the partial rotation of this shaft to effect this purpose also lifts the drag-link 17, and hence the bar 15.

In the right-hand end of the machine I have shown a vertical row of keys, which are constructed and have locking-out mechanism like that just described with respect to the "Yes" and "No" keys. These keys I have designated on the drawings as 19, and they are intended for the use of electors whose franchise is restricted—as, for example, in Ohio, women, whose franchise is limited to that of voting for members of the school-board. When a voter thus restricted enters the booth, it is necessary that all the keys except those he or she may be entitled to vote shall be locked out. The mechanism for accomplishing this I have illustrated in detail in Figs. 10 and 11. It includes a pull-bar 20, the operative end of which protrudes through the back of the machine. This bar has at its under side a pin $20^a$ to enter a notch $5^a$ in one of the blocks 5, a shaft 21, supported between the ends of the case, with cams $21^a$ fast thereon, moving in the vertical planes of the arms $15^b$, so as to impinge upon those arms, and a lever-arm 23, engaged and operated by the pull-bar 20. The pull-bar has a notch $20^b$, into which a latch 24 drops when the pull-bar is drawn out. When this pull-bar 20 is drawn out, the cams $21^a$ depress the bars 15, and therefore prevent the manipulation of the "Yes" and "No" keys 12; but as no cams are provided to act on the bars corresponding to 15 of the "School-Board" keys 19 any one of these keys is left free to be voted. A cam 25 is added to the shaft 6, which when turned to reset all the keys also wipes a laterally-extending arm $24^a$ on the latch 24, lifting said latch out of the notch $20^b$ in the pull-bar 20, thereby releasing said bar, which is restored to its normal or inner position by a spring $20^c$. (See Fig. 4.)

The booth-door is to be provided with a cylinder-cam 26, (see Fig. 9,) engaging a pin $6^b$ on a crank $6^a$ on the protruding end of the shaft 6, (see Fig. 4,) so that when the voter leaves or enters, as the arrangement may be, the booth the voted keys will all be automatically reset.

What I claim, and desire to secure by Letters Patent, is—

1. In a voting-machine, the combination with a key-voting mechanism, of mechanism adapted to be operated to deliver a separate paper ballot to the voter, and means for locking the ballot-releasing mechanism if a key is voted, and for locking the key-voting mechanism if the ballot-delivering mechanism is operated, substantially as described.

2. In a voting-machine, the combination of mechanism for voting straight party-tickets and upon questions submitted to electors, mechanism adapted to be operated to deliver a separate paper ballot to the voter, mechanism permitting voting by those of limited franchise, and means operative by the judges of election for locking out all except the last-named mechanism, substantially as described.

3. In a voting-machine, the combination of mechanism for voting straight party-tickets and upon questions submitted to electors, mechanism for delivering to the voter a separate paper ballot, and mechanism permitting voting by those of limited franchise, means operative by the judges of election for locking out all the mechanism except the last named, and mechanism for resetting simultaneously all the mechanism, substantially as described.

4. In a voting-machine, the combination of straight-ticket-voting mechanism, a paper-ballot receptacle, a key to be operated to release to the voter a ballot from said receptacle, locking-out devices common to the straightticket-voting mechanism and the ballot-releasing key, substantially as described.

5. In a voting-machine, keys for voting straight tickets, a ballot-receptacle, a drawer therein adapted to be operated to extract a ballot from a package of ballots therein, means for locking said drawer in its closed position, means for locking the same in its open position, combined with a key to be operated to release the drawer, and mechanism for locking out the straight-ticket keys if the ballot-releasing key is operated, substantially as described.

6. In a voting-machine, keys for voting straight tickets, a ballot-receptacle, a drawer therein adapted to extract a paper ballot from a package of ballots in said receptacle, means tending to open said drawer, means for locking said drawer in its closed position, means for locking the same in its open position, combined with a key to be operated to release the drawer and mechanism for locking out the straight-ticket keys if the ballot-releasing key is operated, substantially as described.

7. In a voting-machine, a case, a ballot-receptacle in said case, a drawer adapted to withdraw from the case a ballot from a package of ballots in the receptacle, an adjustable plate for diminishing or increasing the opening and key-operated devices for releasing said drawer, combined with key-voting mechanism, and means for locking and releasing said key mechanism common also to the operating devices of the drawer in the case through which the ballot is drawn by said drawer, substantially as described.

8. In combination with a voting-machine having voting devices provided with means independent of the door for locking them when voted, rotative means extending beyond the case operated by the door for resetting the voting devices to voting position, a booth having a door permitting ingress or egress of the voter thereto, and a cylinder-cam on said door for operating the rotative means for resetting the voting devices, substantially as described.

9. In a voting-machine, a plurality of push-keys having notches $12^a$, a series of serrations $12^b$ and a notch $12^c$, locking mechanism for said keys comprising separable blocks to be operated by the keys, and a separate sliding bar arranged to be moved to lock both the voted and unvoted keys, substantially as described.

10. In a voting-machine, a plurality of push-keys, locking mechanism for said keys comprising separable blocks, a sliding locking-bar supported by one of said blocks, said bar being moved to lock in the voted key and lock out the unvoted key when one of said keys is voted, substantially as described.

In testimony whereof I affix my signature in presence of two witnesses.

OTTMAR A. GATRELL.

Witnesses:
GEO. W. ALFRED,
GEORGE M. FINCKEL.